United States Patent
Devos et al.

(10) Patent No.: US 9,266,021 B2
(45) Date of Patent: *Feb. 23, 2016

(54) TOKEN CONFIGURED TO INTERACT

(71) Applicant: HEWLETT-PACKARD DEVELOPMENT COMPANY, L.P., Houston, TX (US)

(72) Inventors: John A. Devos, Corvallis, OR (US); Michael Blythe, Albany, OR (US); Ken Anthony, Corvallis, OR (US); Quinn Jemmott, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,693

(22) Filed: Mar. 21, 2014

(65) Prior Publication Data

US 2014/0206447 A1 Jul. 24, 2014

Related U.S. Application Data

(63) Continuation of application No. 11/088,317, filed on Mar. 23, 2005, now Pat. No. 8,702,503.

(51) Int. Cl.
*A63F 9/24* (2006.01)
*A63F 13/20* (2014.01)
*G02B 26/08* (2006.01)

(52) U.S. Cl.
CPC ............ *A63F 13/06* (2013.01); *G02B 26/0833* (2013.01)

(58) Field of Classification Search
CPC ...................................................... A63F 13/06
See application file for complete search history.

(56) References Cited

U.S. PATENT DOCUMENTS

| | | |
|---|---|---|
| 5,539,658 A | 7/1996 | McCullough |
| 5,652,602 A | 7/1997 | Fishman et al. |
| 5,789,733 A | 8/1998 | Jachimowicz et al. |
| 6,237,849 B1 | 5/2001 | Cooper et al. |
| 6,622,919 B1 | 9/2003 | Wilz et al. |
| 6,629,591 B1 | 10/2003 | Griswold et al. |
| 6,657,543 B1 | 12/2003 | Chung |
| 6,676,517 B2 | 1/2004 | Beavers |
| 6,708,883 B2 | 3/2004 | Krichever |
| 8,702,503 B2* | 4/2014 | Devos et al. ............ 463/30 |
| 2001/0016515 A1 | 8/2001 | Oliver |
| 2002/0147042 A1 | 10/2002 | Vuong et al. |
| 2003/0003997 A1 | 1/2003 | Vuong et al. |
| 2003/0022714 A1 | 1/2003 | Oliver |
| 2004/0089709 A1 | 5/2004 | Frick et al. |

* cited by examiner

*Primary Examiner* — Steve Rowland
(74) *Attorney, Agent, or Firm* — Fabian VanCott

(57) ABSTRACT

Embodiments of a token configured to interact are disclosed.

18 Claims, 10 Drawing Sheets

TOKEN CONFIGURED TO INTERACT

BACKGROUND

Interactive display systems may be configured to receive input data through devices that interact with a display. However, these devices may be undesirably limited in the ways that they can interact with the display system and each other.

BRIEF DESCRIPTION OF THE DRAWINGS

The accompanying drawings illustrate various exemplary embodiments of the present system and method and are a part of the specification. The illustrated embodiments are merely examples of the present system and method and do not limit the scope thereof.

Throughout the drawings, identical reference numbers designate similar, but possibly not identical, elements.

DETAILED DESCRIPTION

The present exemplary system and method use any number of signaling interaction methods to enable collaboration and interaction between components of a single token, multiple tokens, and/or objects in the environment of a token. More specifically, through the use of radio frequencies or other signaling methods, interactive tokens may collaborate and interact with other tokens by having an "awareness" of nearby tokens, identifying locations of nearby tokens and objects, establishing relationship information with other tokens or objects, and/or sharing information among and/or between tokens and nearby objects. Further, a system and a method for performing the above-mentioned collaboration and interaction are disclosed herein including an embodiment of a display system, such as an interactive display system, that may be used as a communication medium. Optical communication along with radio frequency (RF) signaling and other types of signaling interaction may enable the mentioned collaboration and interaction.

In the following description, for purposes of explanation, numerous specific details are set forth in order to provide a thorough understanding of the present system and method for enabling token interaction. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification may possibly not be referring to the same embodiment.

Figure 1:
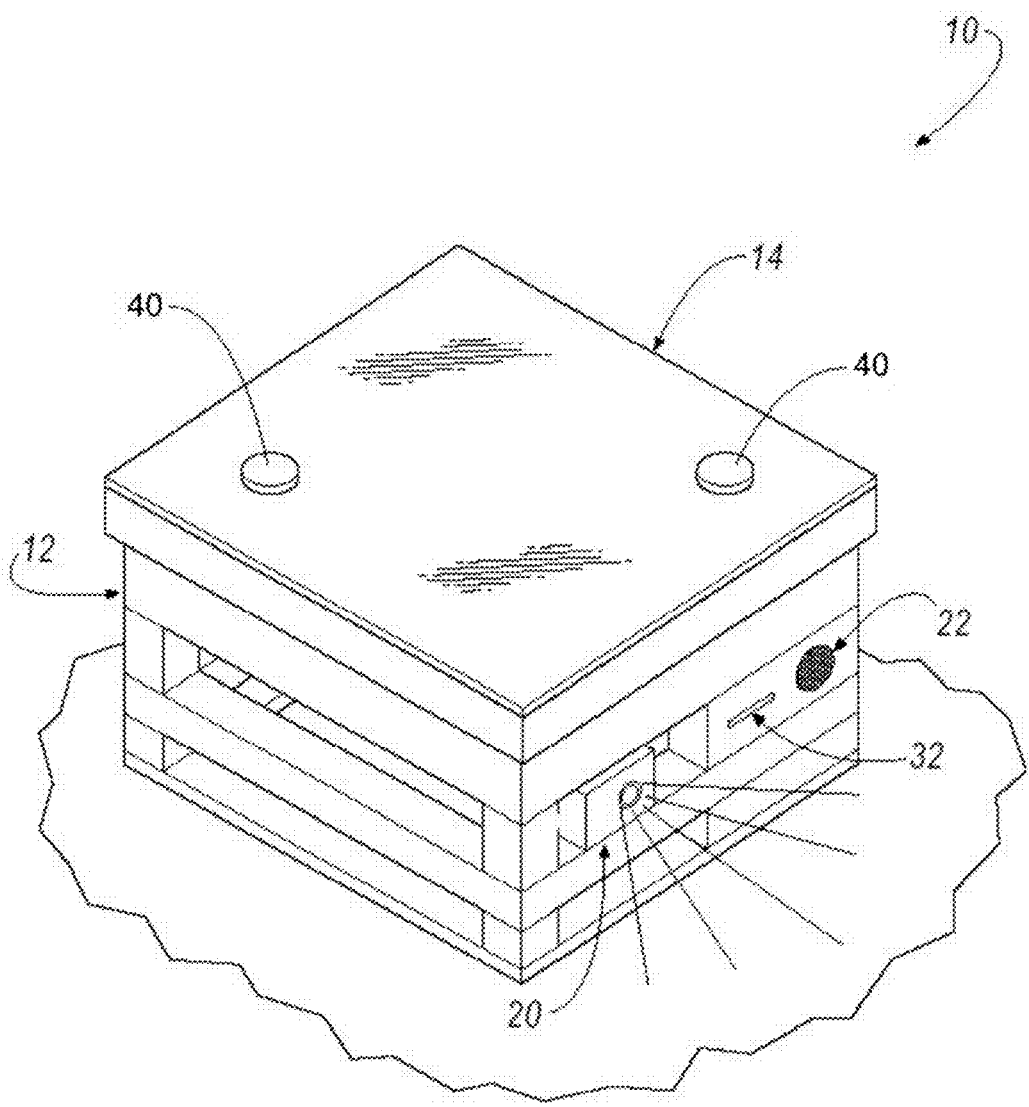
FIG. 1 is a perspective view of an embodiment of an interactive display system, according to one exemplary embodiment.
Figure 2:
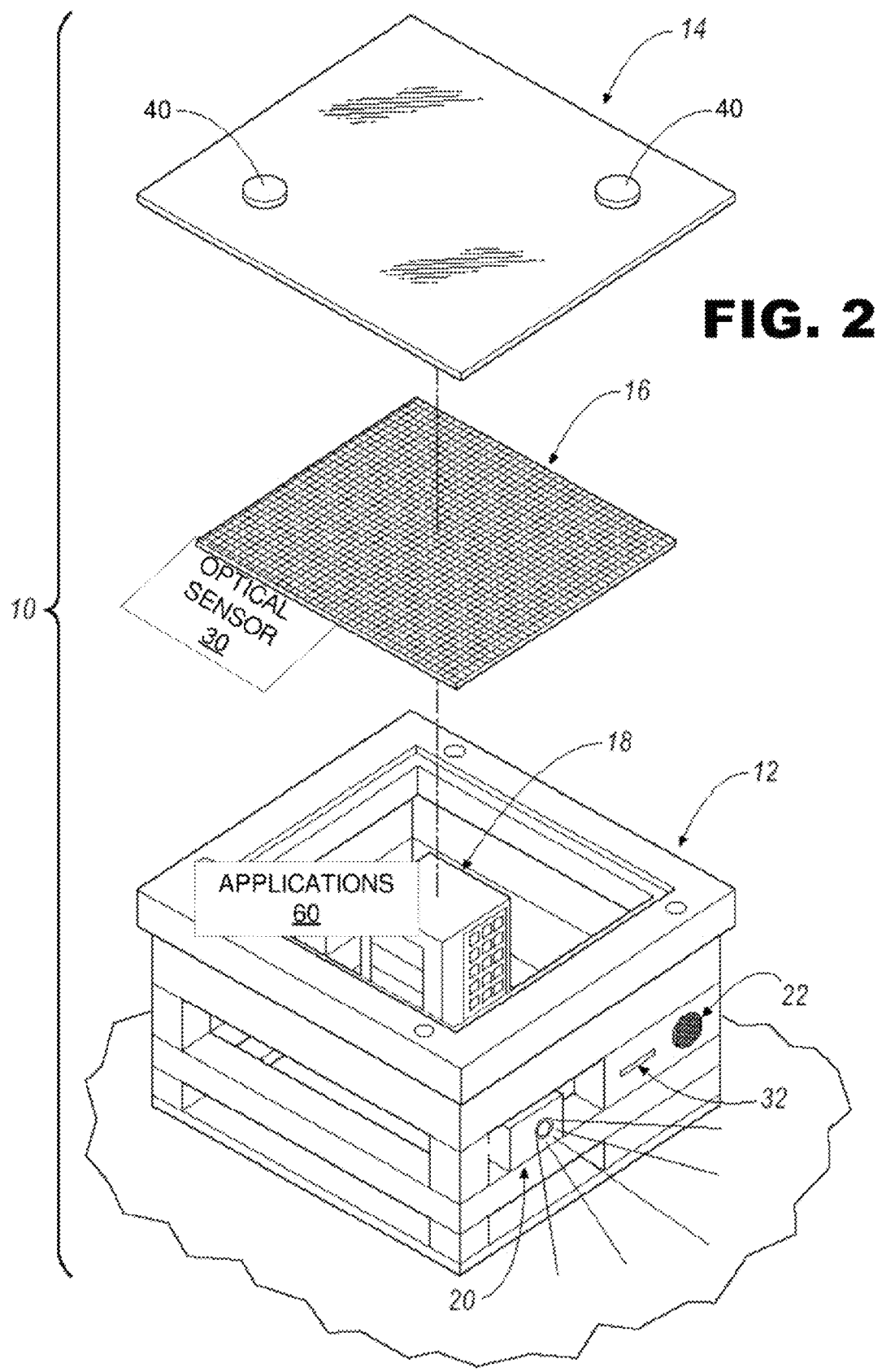
FIG. 2 is an exploded perspective view of the embodiment of the interactive display system of FIG. 1, according to one exemplary embodiment.

Referring now to FIGS. 1 and 2, an embodiment of a display system, such as an interactive display system (10), is shown according to one exemplary embodiment. According to the exemplary embodiment shown, the interactive display system (10) is shown as embodied in a "table" (12), with the table surface functioning as the display surface (14). According to the exemplary configuration illustrated in FIGS. 1 and 2, multiple users, each having his/her own token (40), may view and access the display surface (14) by positioning themselves around the table (12). While the present exemplary system and method are described in the context of an interactive display system (10) embodied in a table (12), the physical embodiment of the display system may take any number of forms other than that of a "table."

Continuing with reference to FIGS. 1 and 2, the exemplary interactive display system (10) includes an embodiment of a display device having a display surface (14) and a digital light processor (DLP) (16). The interactive display system (10) further includes at least one optical sensor (30), and a controller (18) having access to one or more applications (60). According to one exemplary embodiment, the controller (18) is configured to generate electrical image signals indicative of viewable images, such as computer graphics, movie video, video games, Internet Web pages, etc., which are provided for generation to the DLP (16). Additionally, digital information may be provided by the DLP (16) that is not readily visible to the unaided human eye. For example, according to one exemplary embodiment, digital data streams may be aggregated into the visible DLP stream to be detected by electronic devices such as tokens, etc. The controller (18) may take several forms, such as a personal computer, microprocessor, or other electronic devices capable of providing image signals to a DLP. The DLP (16), in response to the electrical signals, generates digital optical (viewable) images on the display surface (14). The controller (18) may receive data and other information to generate the image signals from various sources, such as hard drives, CD or DVD ROMs (32), computer servers, local and/or wide area networks, hosted applications (60), tokens, and the Internet, for example. While the controller (18) is illustrated as being disposed in the table itself, it may also be remotely located and communicatively coupled to the display surface (14) by physical wires or wireless means, according to one exemplary embodiment. Additionally, the controller (18) may receive data and other information received by the at least one optical sensor (30). The optical sensor (30) may include, but is in no way limited to, a charge coupled device (CCD), a complementary metal oxide semiconductor (CMOS) laser sensor, or any other optical sensor configured to detect the presence of a token (40) on the display surface (14). The controller (18) may also provide additional output in the form of projected images from an auxiliary projector (20) and sound from a speaker (22).

As shown in FIGS. 1 and 2, the interactive display system (10) can include a variety of additional components, such as a projector (20), configured to simultaneously project the content of the display surface (14) onto a wall-mounted screen, for example. According to one exemplary embodiment, the content displayed on the display surface (14) and the content displayed by the projector (20) may be the same or different. The interactive display system (10) may also include one or more speakers (22) for producing audible sounds that accompany the visual content on the display surface (14). Further, the interactive display system (10) may include one or more devices for storing and retrieving data, such as a CD or DVD ROM drive, disk drives, USB flash memory ports, etc.

While the interactive display system (10) is described herein in the context of a display device including a DLP (16), the present systems and methods are in no way limited to facilitating token (40) interaction through a display surface (14) and a DLP display device (16). Rather, any number of display devices having an optical sensor configured to detect an object on a display surface may be used to facilitate token interaction according to the present exemplary embodiment including, but in no way limited to, a liquid crystal display (LCD), a plasma display, or a flat panel display. Additionally, other non-optical sensors may be used to detect objects on the display surface (14) including, but in no way limited to, sonic detection, vibration, force/deflection detection, etc. Further, while the above-mentioned interactive display system (10) includes a display surface (14), a number of the present token interaction systems and methods may be incorporated by a token without being associated with a display surface, as will be described in further detail below.

According to the exemplary embodiment illustrated in FIGS. 1 and 2, the DLP (16) may assume a variety of forms. In general, the DLP (16) generates a viewable digital image on the display surface (14) by projecting a plurality of pixels of light onto the display surface. Each viewable image may be made up of millions of pixels. Each pixel is individually controlled and addressable by the DLP (16) to have a certain color (or grey-scale). The combination of many light pixels of different colors (or grey-scales) on the display surface (14) generates a viewable image or "frame." Continuous video and graphics may be generated by sequentially combining frames together, as in a motion picture.

One embodiment of a DLP (16) includes a digital micro-mirror device (DMD) configured to vary the projection of light pixels onto the display surface (14). Other embodiments could include, but are in no way limited to, diffractive light devices (DLD), liquid crystal on silicon devices (LCOS), plasma displays, and liquid crystal displays. Additionally, other spatial light modulator and display technologies could be substituted for the DLP (16) without varying from the scope of the present system and method.

Figure 3:
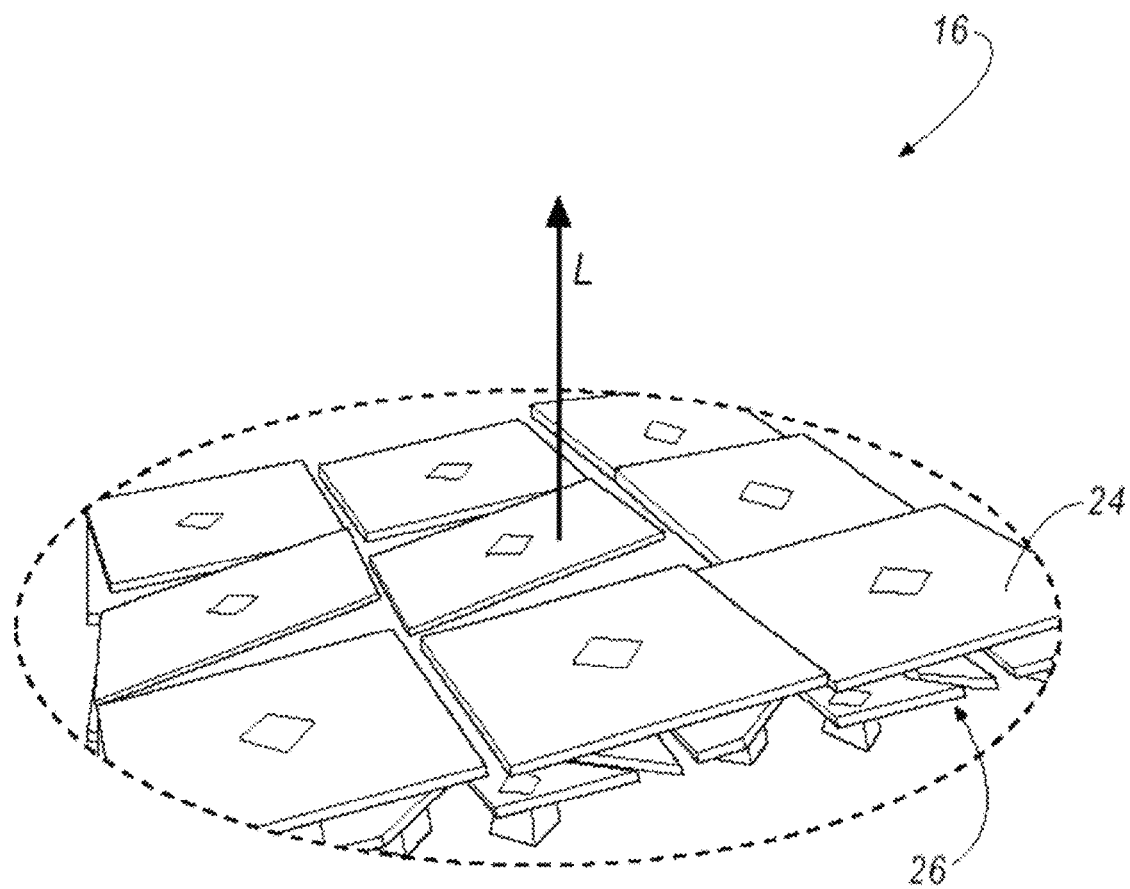
FIG. 3 is a close-up perspective view of a portion of an embodiment of a digital light processor used in the display system of FIG. 1, according to one exemplary embodiment.

FIG. 3 is a close-up view of a portion of an exemplary DMD, according to one exemplary embodiment. As shown in FIG. 3, the DMD includes an array of micro-mirrors (24) individually mounted on hinges (26). Each micro-mirror (24) corresponds to one or more pixel(s) in an image projected on the display surface (14). The controller (18; FIG. 2) provides light modulation signals indicative of a desired viewable image or optical data stream to the DLP (16). In response to the received signals, the DLP (16) causes each micro-mirror (24) of the DMD to modulate light (L) to generate an all-digital image onto the display surface (14). Specifically, the DLP (16) causes each micro-mirror (24) to repeatedly tilt toward or away from a light source (not shown) in response to the image signals from the controller (18), effectively turning the particular pixel associated with the micro-mirror "on" and "off", which normally occurs thousands of times per second. When a micro-mirror (24) is switched on more frequently than off, a light gray pixel is projected onto the display surface (14). Conversely, when a micro-mirror (24) is switched off more frequently than on, a darker gray pixel is projected. A color wheel (not shown) may also be used to create a color image. The individually light-modulated pixels may be configured to form a viewable image or frame on the display surface (14).

Figure 4:
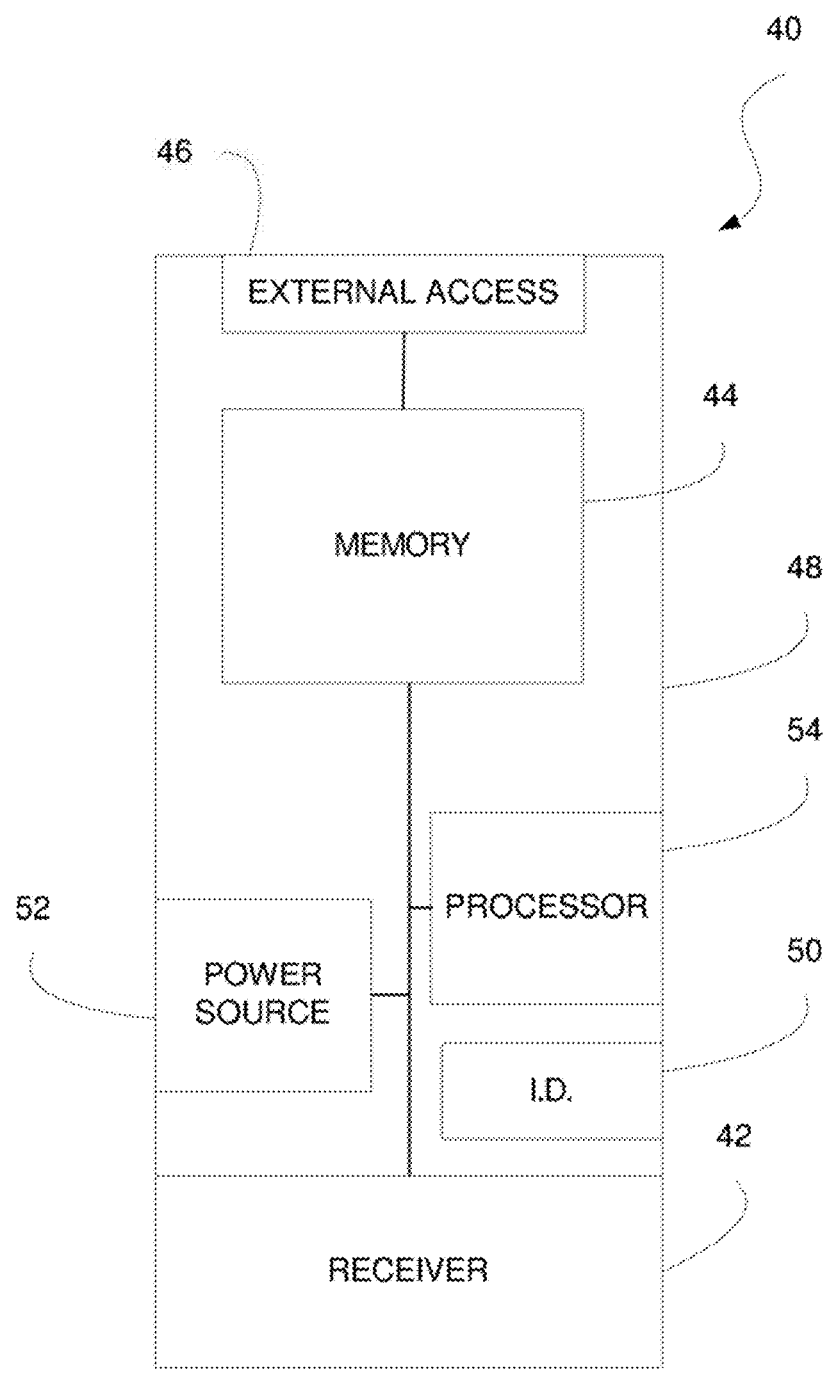
FIG. 4 is a simple block diagram illustrating the components of an embodiment of a token including one or more symbols, according to one exemplary embodiment.

Returning again to FIGS. 1 and 2, the interactive display system (10) further includes one or more tokens (40) having the ability to facilitate token interaction. The interactive tokens (40) illustrated in FIGS. 1 and 2 can assume a variety of physical forms, such as pointing devices (computer mouse, white board pen, etc.), gaming pieces, multimedia devices, physical manipulation tools, and the like. FIG. 4 further illustrates the components of an embodiment of a token, such as the interactive token (40), according to one exemplary embodiment. As shown in FIG. 4, the exemplary interactive token (40) includes, but is in no way limited to, an outer housing (48) configured to protect the internal components of the token. As mentioned previously, the outer housing (48) of the interactive token (40) may assume any number of shapes and sizes including, but in no way limited to, pointing devices (computer mouse, white board pen, etc.), gaming pieces, multimedia devices, physical manipulation tools, and the like. According to one exemplary embodiment, the outer housing (48) of the token (40) assumes a shape associated with an application (60) to be performed by the token.

As shown in FIG. 4, the interactive token (40) includes components configured to facilitate token interaction. More specifically, as illustrated in FIG. 4, the interactive token includes an outer housing (48) that may assume any number of physical forms and that houses a number of interactive components. As shown, the interactive token (40) may include, but is in no way limited to, a receiver (42), a memory (44) or other data storage device, and/or an external access device (46) at least partially contained within the outer housing (48). According to one exemplary embodiment of the interactive token (40), the receiver (42) includes an optical receiver that is configured to receive optical signals from the DLP (16) through or near the display surface (14). Additionally, according to one exemplary embodiment, the receiver (42) may also receive information from the side of the display surface, depending on the line of sight between the display surface (14) and the signal receiver. Additionally, according to one exemplary embodiment, the token (40) may be hard-wired to the controller (18). For example, the receiver (42) may be a photo receptor such as a photocell, a photo diode, a charge coupled device (CCD), or any other signal receiving device embedded in one surface of the interactive token (40). Additionally, according to the present exemplary embodiment, the receiver (42) may be configured to receive any number of wirelessly transmitted signals including, but in no way limited to, an infrared (IR) signal receiver, an ultraviolet (UV) light signal receiver, a radio frequency (RF) receiver, a laser signal receiver, or a transceiver capable of both receiving and sending communication signals.

Further, FIG. 4 illustrates a memory component (44) communicatively coupled to the receiver (42). According to one exemplary embodiment, the memory component (44) may be any device, or combination of devices, configured to selectively receive, format, and store received data. Accordingly, the memory component (44) may include, but is in no way limited to, a memory access ASIC or a processor, a read only memory (ROM), a random access memory (RAM), a flash memory, a virtual memory, and the like.

The external access component (46) of the token (40) is configured to allow a user to access data saved in the memory component (44). Accordingly, any number of external access components (46) may be included in the token (40) including, but in no way limited to, an earphone jack, a speaker jack, an infrared transmitter, a radio frequency transmitter, a speaker, a motion actuator, a light source, a keystone jack, a universal serial bus (USB) port, a serial port, a wireless transmitter, a small LCD panel, a light array, and/or other visual stimuli. According to one exemplary embodiment, an external access component (46) in the form of a wireless transmitter is configured to transmit data to an external receiving device, such as another token (40), a third party object, or the interactive display system controller (18; FIG. 2). This allows the tokens (40) to communicate their respective positions and/or subset application commands to the controller (18; FIG. 2) through the display surface (14; FIG. 2) or to another token (40) or a third party object through wired or wireless transmission means, as will be further developed below.

In addition to the exemplary components illustrated in FIG. 4, the present interactive tokens (40) may also include any number of unique identifiers (50), power sources (52), and/or processing components (54) configured to facilitate the interactive capabilities of the present exemplary tokens (40). More specifically, according to one exemplary embodiment, the present interactive tokens (40) may include a unique identifier (50). The unique identifier (50) assigned to each interactive token (40) may allow for the rapid identification of the token user. Additionally, the unique identifier (50) may be used by the controller (18; FIG. 2) and/or other interactive tokens (40) to allocate token characteristics to the identified token. For example, if the exemplary interactive token (40) represents a gaming token, the unique identifier (50) may be used by the controller (18; FIG. 2) and/or other interactive tokens (40) to allocate features that represent capabilities used in playing games (type of character, type of weapons, etc.) to the identified interactive token. According to one exemplary embodiment, the unique identifier may include, but is in no way limited to, a passive identification circuit configured to emit a predetermined frequency when activated, an optical code such as a bar code or image, or an active identification circuit configured to continually emit a predetermined frequency or data string.

Additionally, as illustrated in FIG. 4, the exemplary interactive token (40) may include a power source (52). According to one exemplary embodiment, the power source (52) is configured to provide power to the other components of the exemplary interactive token (40). By way of example, the power source (52) of the present exemplary interactive token (40) may include, but is in no way limited to, an on-board power supply such as batteries, a passive power supply such as one configured to be powered passively through inductive or capacitive coupling, or with a light energy power supply such as a photovoltaic cell or module which receives light from the interactive display system (10; FIG. 1).

Additionally, as illustrated in FIG. 4, the present interactive token (40) may also include an on-board processing unit (54). According to one exemplary embodiment, the on-board processing unit (54) may be configured to perform computer processing functions including, but in no way limited to, executing programs, enhancing gaming capabilities, enabling the interactive tokens to identify and 'experience' surroundings, and to gain/learn links into further information. Further, tokens (40) may be able to 'sense' attributes concerning their environment and pass that data on to other tokens or system processors. Also, the token (40) may process the data through onboard capabilities which would alter the token behavior in the context of the application for which they were configured.

Figure 5:
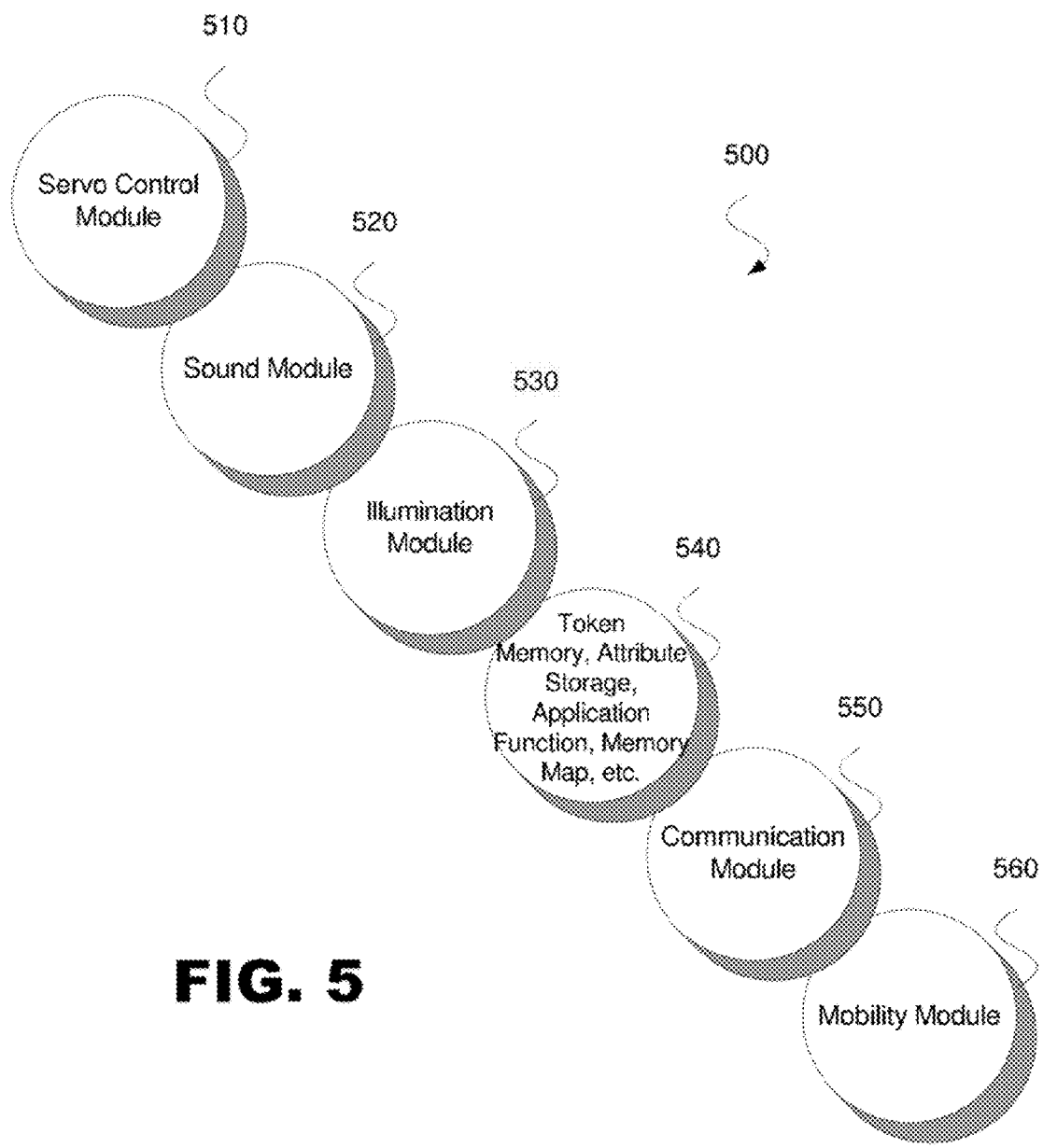
FIG. 5 is a simple block diagram illustrating the module structure of an embodiment of a token, according to one exemplary embodiment.

FIG. 5 illustrates an embodiment of a module configuration that may be applied to the interactive tokens, according to one exemplary embodiment. As illustrated in FIG. 5, a number of modules (500) may be configured to independently add or enhance a number of functions to the interactive token (40; FIG. 4), according to one exemplary embodiment. While a number of functions are illustrated in the exemplary modules of FIG. 5, it is to be understood that any number of functions and/or enhancements may be provided by the modules (500).

As illustrated in FIG. 5, a first module is illustrated as a servo control module (510). According to one exemplary embodiment, the servo control module (510) may facilitate any number of servo controlled movements to be performed by the interactive token (40; FIG. 4). Similarly, the sound module (520) may include, but is in no way limited to, a speaker and/or any number of associated drivers or devices configured to produce sounds related to the function of the exemplary interactive token (40: FIG. 4). Moreover, the illumination module (530) illustrated in FIG. 5 may include a number of light emitting components that selectively illuminate in response to received information or signals. Acceptable light emitting components include, but are in no way limited to, light emitting diodes (LEDs).

Further, FIG. 5 illustrates a token memory, attribute storage, application function, and memory map module (540). According to this exemplary embodiment, the token memory (540) may perform the same data storage applications as mentioned herein with reference to the data storage or memory component (44) of the interactive token (40; FIG. 4). Further, the communication module (550) illustrated in FIG. 5 may perform communication functions, both transmission and receiving, as described herein with respect to the external access (46; FIG. 4) and the receiver (42; FIG. 4). The mobility module (560) illustrated in FIG. 5 may be included to facilitate autonomous translation of the interactive token (40), when commanded. While the modules (500) illustrated in FIG. 5 are represented as generic cylinders, the modules may, according to one exemplary embodiment, assume a shape related to their function.

According to the exemplary module embodiment illustrated in FIG. 5, the numerous modules may be added to a base of an interactive token (40; FIG. 4) to perform the above-identified functions. Further, communication is facilitated between the modules (500) to efficiently transfer information and to perform desired functions. According to one exemplary embodiment, the exemplary modules may communicate via any number of communication techniques including, but in no way limited to, RF transmission, IR transmission, ultrasonic transmission, optical transmission, hard wires, and the like.

Figure 6:
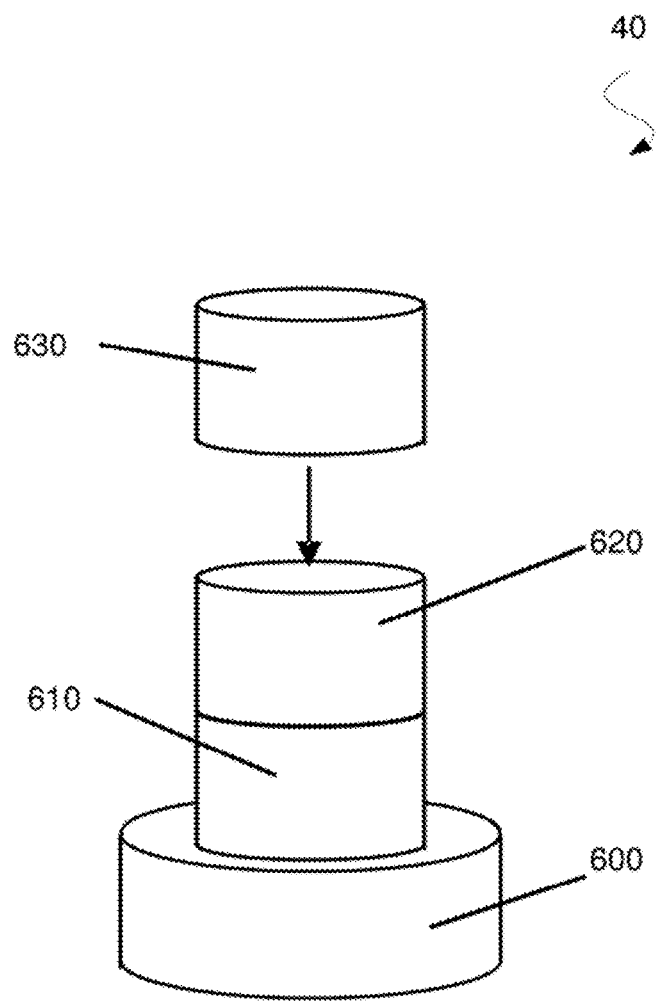
FIG. 6 is a simple perspective view further illustrating the module structure of an embodiment of a token, according to one exemplary embodiment.

FIG. 6 further describes the module configuration of FIG. 5, according to one exemplary embodiment. As illustrated in FIG. 6, collaboration and interaction of an interactive token (40) may be enhanced by the use of the stackable or connectable modules illustrated in FIG. 5. As shown in FIG. 6, a first module (630) may be added to represent a type of weapon possessed by the interactive token (40) serving as a game piece. Accordingly, the first module may contain information related to the represented weapon, which is then transmitted to the other portions of the interactive token (40), such as the base unit (600), as well as to other signal receiving devices. According to one exemplary embodiment, the module may assume a form that somehow represents the weapon associated therewith. Additionally, a second module (620) may be added to represent a type of armor possessed by the interactive game token (40). Further characteristics may also be added through modules including, but in no way limited to, the addition of a type of character by a third module (610) and/or a team association demonstrated by the base (600). According to this exemplary embodiment, the attributes represented by the various modules will then be communicated with each other and with other tokens or third party objects.

Figure 7:
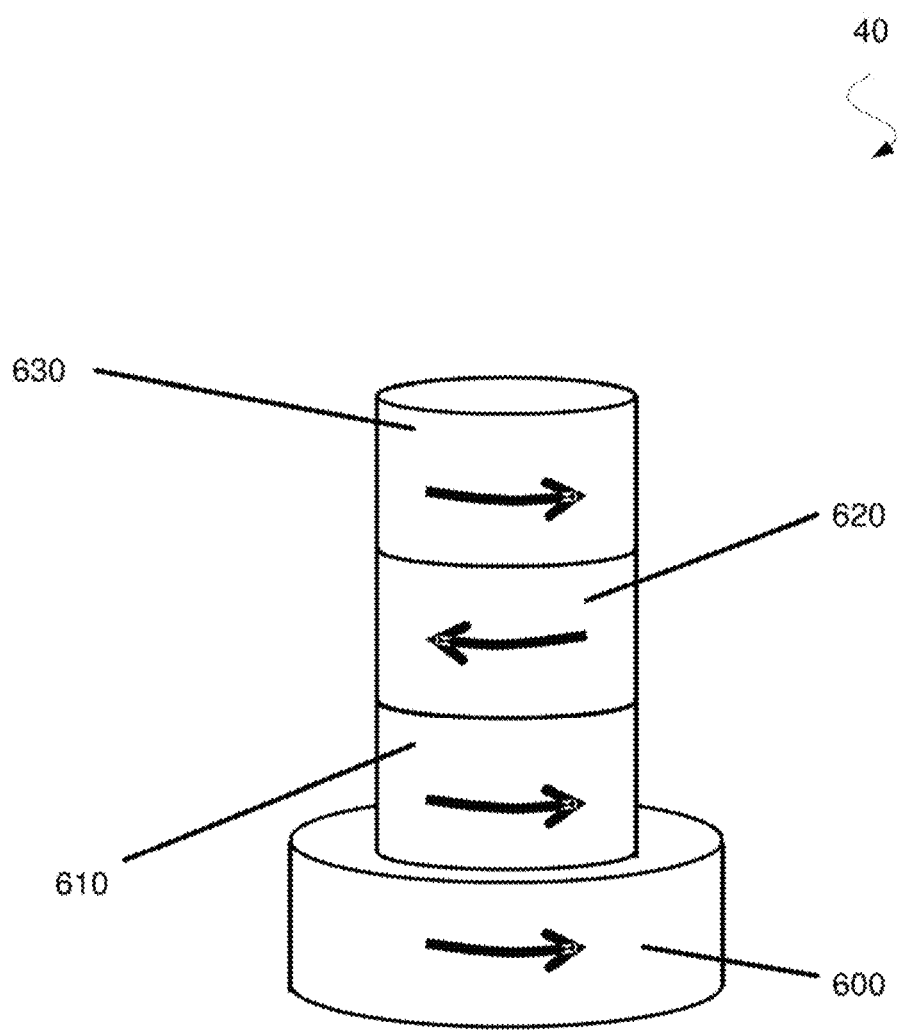
FIG. 7 is a simple perspective view further illustrating the module structure of an embodiment of a token, according to one exemplary embodiment.

FIG. 7 illustrates yet another embodiment of the module configuration, according to one exemplary embodiment. As illustrated in FIG. 7, collaboration and interaction of an interactive game token (40) may be enhanced by altering an orientation of the communicating modules (500; FIG. 5). According to one exemplary embodiment, the stackable or connectable modules illustrated in FIG. 7 may provide various characteristics to the interactive game token (40) depending on their orientation. For example, rotating a first module (630) in a clockwise direction may increase a weapon range of the interactive token (40) serving as an avatar. However, this increase in range may also be accompanied by a decrease in an ability to inflict damage. Similarly, rotating a second module (620) in a clockwise direction may increase armor strength, while reducing mobility. Rotating a third module (610) may change a military rank of the interactive token (40) Finally, rotating a fourth or base module (600) may determine which direction the interactive token (40) is facing in a battle.

Figure 8:
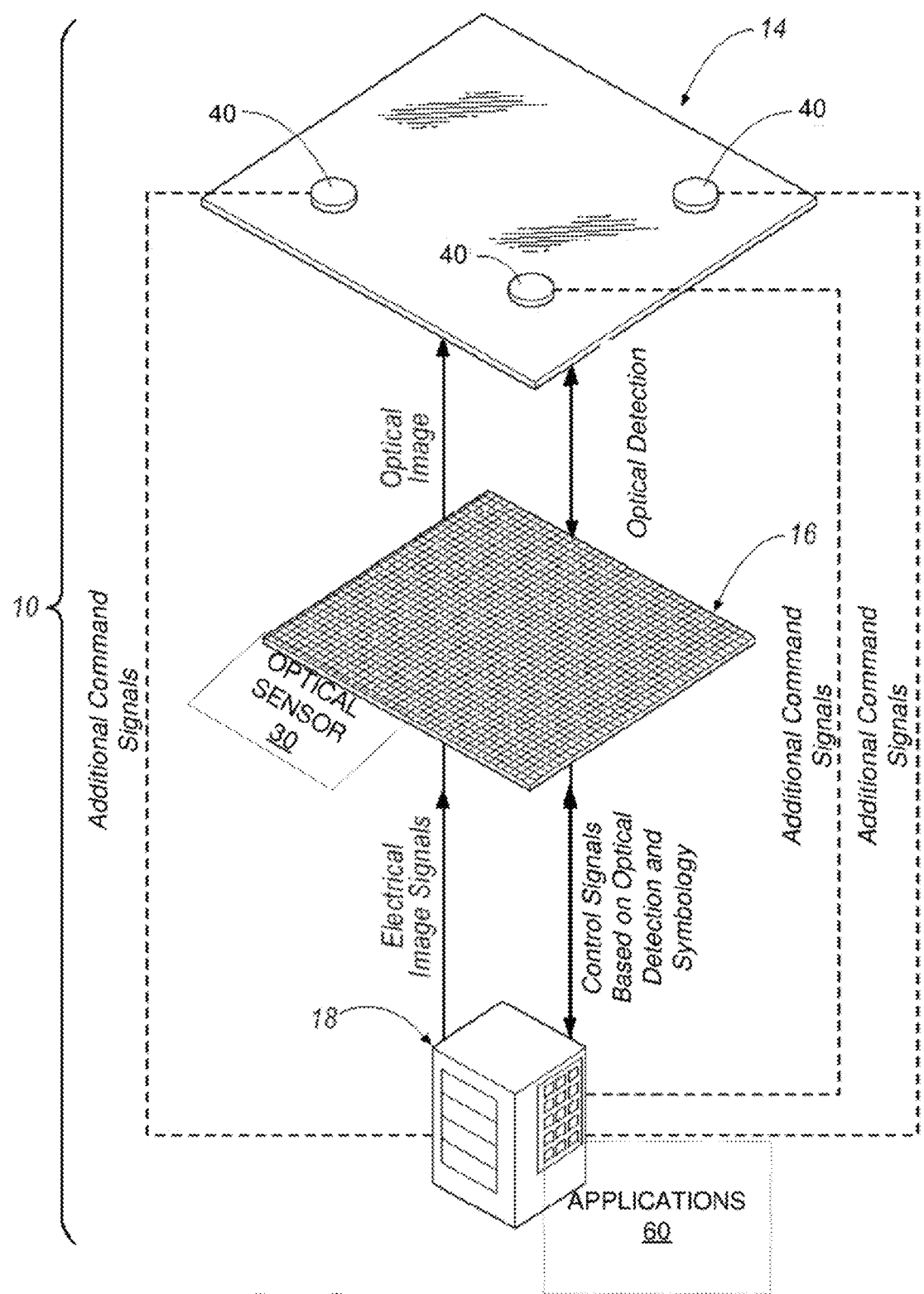
FIG. 8 is an exploded perspective view illustrating communications between embodiments of a number of tokens and an embodiment of an application, according to one exemplary embodiment.

FIG. 8 illustrates one exemplary embodiment for enabling and performing collaboration and interaction between a number of interactive tokens (40) disposed on the display surface (14), according to one exemplary embodiment. As illustrated in FIG. 8, the interactive display system (10) facilitates two-way communication between the controller (18) and the tokens (40) by first detecting the tokens and initiating applications (60) associated with the detected tokens. According to one exemplary embodiment, the tokens (40) are identified via optical detection. Additionally, according to one exemplary embodiment, additional command signals may be transmitted to the controller (18) via external transmitting components, such as third party objects having transmitters. Further, each token (40) placed in contact with the display surface (14) may receive optical data signals from the controller (18) in the form of modulated optical signals (optical positioning signals) via the DLP (16), which is controlled by electrical positioning signals and electrical image signals from the controller (18), The optical signal transmitted by the DLP (16) may be in the form of a series of optical pulses that are coded according to a variety of encoding techniques.

Two-way communication between the controller (18) and each token (40) allows the interactive display system (10) to accommodate simultaneous input from and output to multiple tokens. Two-way communication between the tokens (40) and the controller (18) also allows the system to use a feedback mechanism to establish a unique "handshake" between each token and the controller. The unique "handshake" may be accomplished in various ways.

Once each token (40) on the display surface (14) is identified and actively communicating with the controller (18), multiple tokens (40) may relay their position and/or additional communication to other tokens on the display surface (14) via the controller (18).

Figure 9:
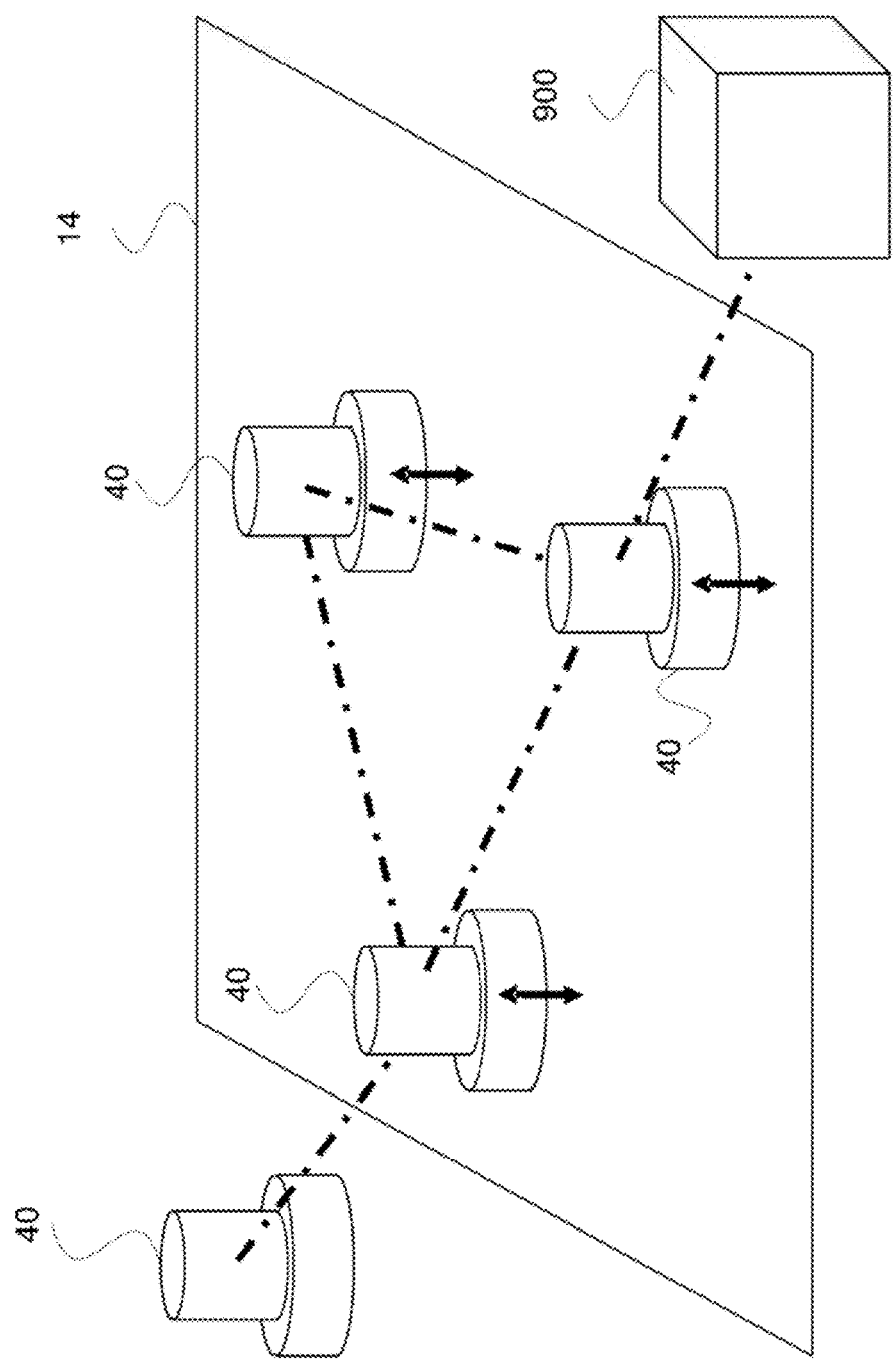
FIG. 9 is a simple block diagram illustrating communication between embodiments of a number of tokens, an embodiment of an interactive display surface, and a third-party object, according to one exemplary embodiment.

Additionally, as illustrated in FIG. 9, the present interactive tokens (40) may be configured to transmit and receive information from interactive tokens (40) and third party objects (900) located within a communications range off of the display surface (14) via wireless communication. As noted previously, the interactive tokens (40) are configured to communicate with the interactive display system (10; FIG. 1) through any number of communication techniques including, but in no way limited to, optical communication, IR transmission, RF transmission, ultrasonic transmission, and the like. Additionally, as illustrated by the dashed lines in FIG. 9, the present interactive tokens (40) may communicate with any number of data transmitting objects within the transmission range of the exemplary tokens (40). As shown, the data transmitting objects may include, but are in no way limited to, interactive tokens (40) located off of the display surface (14) and/or third-party objects (900) configured to transmit and/or receive data communications as mentioned above.

According to the exemplary embodiment illustrated in FIG. 9, the ability to collaborate and interact with nearby tokens (40) and third-party objects (900) allows for a number of data transmission opportunities. For example, according to one exemplary embodiment, a promotional opportunity may occur by incorporating a third-party object (900) configured to transmit data to and/or from an interactive token (40) in a restaurant or retail location. According to this exemplary embodiment, coupons, discounts, and/or reward points may accumulate on the memory (44; FIG. 4) of the interactive token (40) when in the vicinity of the third-party object (900). Similarly, according to one exemplary embodiment, video clips, JPEG images, and/or sound clips of an entertainment activity, such as an amusement park ride or a sporting event, may be transmitted to an interactive token (40). This data may then be viewed or otherwise accessed at a Kiosk near the entertainment activity or at another interactive display system (10; FIG. 1).

Alternatively, when the interactive token is used as an avatar or a representation of a user in a gaming environment, gaming opportunities may present themselves as the interactive token (40) is transported. According to this exemplary embodiment, a user may transport their interactive token with them to a designated area. If the interactive token (40) in the form of an avatar passes with in a transmission zone of another interactive token (40), a "game" or "match" may occur between the avatars based on the character, weapon, and other capabilities of the interactive token (40).

Figure 10:
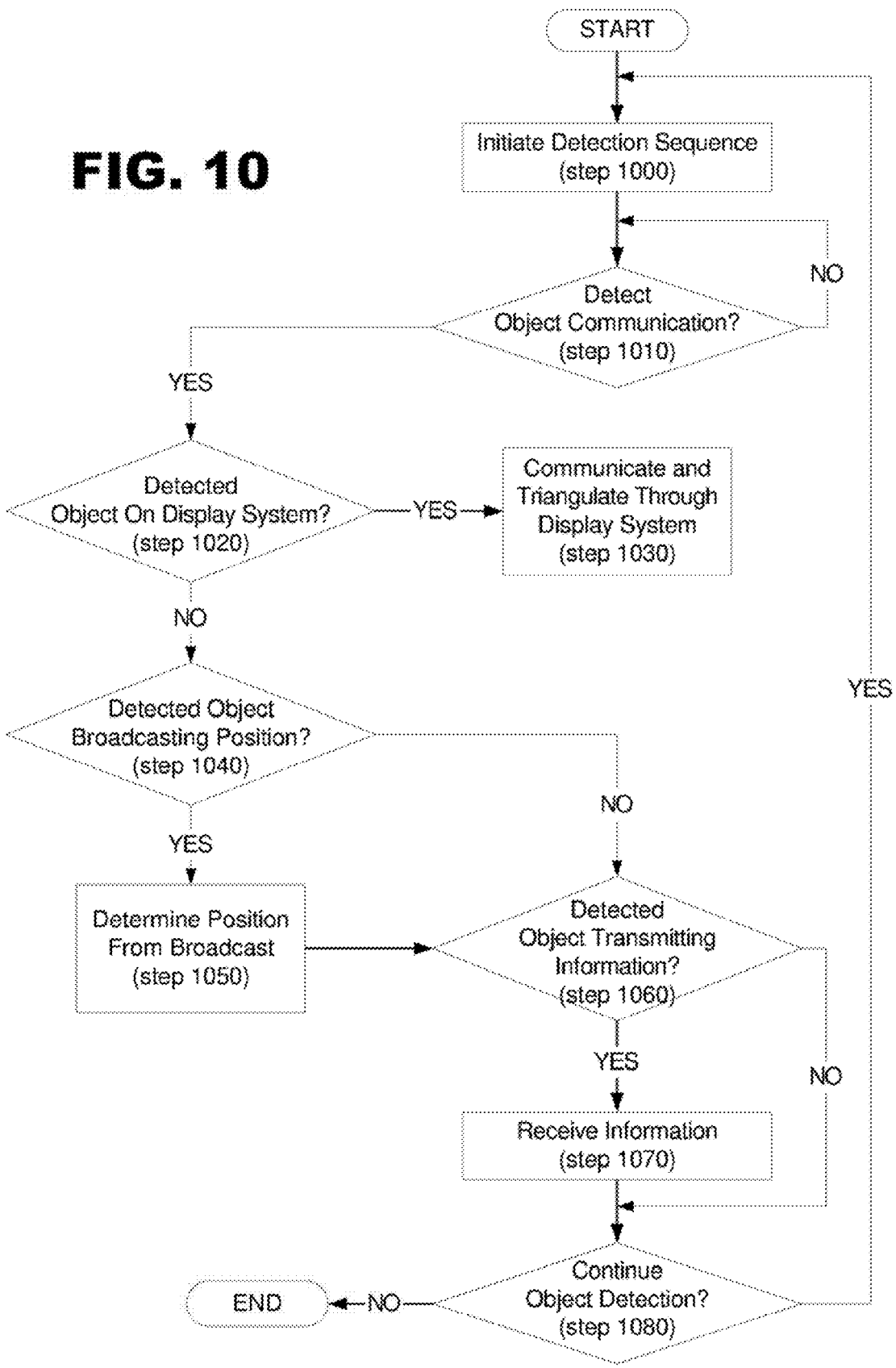
FIG. 10 is a flow chart illustrating an embodiment of a method for detecting position and receiving data from tokens or objects around a token, according to one exemplary embodiment.

FIG. 10 illustrates an embodiment of a communication detection method that may be performed by the interactive token (40), according to one exemplary embodiment. As illustrated in FIG. 10, the interactive token is activated and a detection sequence is initiated (step 1000). Activation of the detection sequence may be initiated manually by a user or, according to one exemplary embodiment, the detection sequence may automatically be initiated when in the presence of a specified signal.

Once the detection sequence is initiated, the interactive token determines whether an object communication is detected (step 1010). As mentioned previously, object communication may be detected by reception of an optical signal, an RF signal, an IR signal, an ultrasonic signal, and the like. If no communication is detected (NO, step 1010), the detection sequence continues. If, however, a communication is detected by the interactive token (YES, step 1010), the interactive token then determines if the detected transmission is being received from an object on the display system (step 1020). According to one exemplary embodiment, an interactive token (40; FIG. 4) may determine that the detected transmission is detected from an object on the display system if the received transmission is received via the display surface (14). If the communication is coming from the viewing device or an object located on the viewing device (YES, step 1020), communication and location triangulation is performed via the display system (step 1030).

If, however, the detected communication is coming from an object not on the display system (NO, step 1020), the interactive token then determines if the detected object is broadcasting position information (step 1040). If, the detected object is broadcasting position information (YES, step 1040), the interactive token receiving the object communication determines the object location from the broadcast information (step 1050). Once the position is determined from the broadcast information (step 1050), or if the detected object is not broadcasting position information (NO, step 1040), the interactive token then determines if the detected object is transmitting information (step 1060). If the detected object is transmitting information (YES, step 1060), the interactive token then receives the transmitted information (step 1060) via any number of the above-mentioned data transmission methods.

Once the information is received, or if the detected object is not transmitting information (NO, step 1060), the interactive token then determines if it should, based on received information, continue to detect object communication (step 1080). If continued object detection is desired (YES, step 1080), the communication detection sequence is again initiated (step 1000) and the communication detection method continues. If, however, the interactive token determines that the object detection is no longer desired (NO, step 1080), the present method ends.

In conclusion, embodiments of the present system and method for enabling collaboration and interaction between components of a single token, multiple tokens, and/or objects in the environment of a token use radio frequencies or other signaling methods. More specifically, the present system and method may incorporate wireless transmission means to allow interactive tokens to collaborate and interact with other tokens by having an "awareness" of nearby tokens, identifying a location of nearby tokens, establishing relationship information with other tokens or objects, and/or sharing information among and/or between tokens and nearby objects, thereby enhancing the user experience.

The preceding description has been presented to illustrate and describe exemplary embodiments of the system and method. It is not intended to be exhaustive or to limit the system and method to any precise form disclosed. Many modifications and variations are possible in light of the above teaching. It is intended that the scope of the system and method be defined by the following claims. Where the claims recite "a" or a "first" element of the equivalent thereof, such claims should be understood to include incorporation of one or more such elements, neither having to include nor excluding two or more such elements.

What is claimed is:

1. A system comprising:
a display device;
a sensor for detecting tokens used with the display device including a first token associated with the display device that comprises an optical sensor to receive data from the display device; and
a controller communicatively coupled to the sensor and the display device;
wherein the controller is to drive the display device to simultaneously display an image with the display device and to optically transfer data, separate from the displayed image, to the optical sensor of the first token using display elements of the display device corresponding to a location of the first token.

2. The system of claim 1, wherein the controller is further to select an application from a plurality of applications based on a detection of the first token.

3. The system of claim 1, wherein the display device includes a display surface and a projection device to project a plurality of pixels onto the display surface.

4. The system of claim 1, wherein the first token comprises an avatar to be used in a gaming environment.

5. The system of claim 1, wherein the token further comprises a photovoltaic cell to generate power for the token by receiving light from the display device.

6. The system of claim 1, wherein the first token comprises a processor, with associated memory, and a sensor in communication with the processor; and
wherein the first token is programmed to sense attributes of its environment and alter token behavior based on the environmental attributes.

7. The system of claim 6, wherein the first token further comprises at least one interactive module to interact with a second token, the second token also associated with the display device.

8. The system of claim 6, wherein the first token further comprises an external access component providing user access to data in the memory.

9. The system of claim 6, wherein the first token further comprises a unique identifier assigned to distinguish the first token from other tokens associated with the display device.

10. The system of claim 1, wherein:
the first token associated with the display device is configured to be selectively repositioned by a user with respect to the display device, and
the first token comprises a processor, with associated memory, and a sensor in communication with the processor;
wherein the first token is programmed to sense attributes of its environment and alter token behavior based on such environmental attributes.

11. The system of claim 10, wherein the first token further comprises at least one interactive module to interact with a second token, the second token also associated with the display device.

12. The system of claim 10, wherein the first token further comprises an external access component providing user access to data in the memory.

13. The system of claim JO, wherein the first token further comprises a unique identifier assigned to distinguish the first token from other tokens associated with the display device.

14. A method of operating a system, the method comprising:
detecting tokens, via a sensor, used with a display device including a first token associated with the display device that comprises an optical sensor to receive data from the display device;
driving, via a controller communicatively coupled to the sensor and the display device, the display device to simultaneously display an image with the display device and to optically transfer data, separate from the displayed image, to the optical sensor of the first token associated with the display device; and
using display elements of the display device corresponding to a location of the first token to optically transfer data to the optical sensor of the first token via the controller.

15. The method of claim 14, further comprising selecting an application from a plurality of applications based on detection of a characteristic of the first token.

16. The method of claim 14, wherein displaying an image with the display device comprises projecting a plurality of pixels onto a display surface of the display device.

17. The method of claim 14, further comprising conducting a game in which the first token comprises an avatar to be used in the game.

18. The method of claim 14, wherein the token further comprises a photovoltaic cell, and the method further comprises generating power for the token by receiving light from the display device with the photovoltaic cell.

* * * * *